June 2, 1936.  F. O. GRAHAM  2,042,523
REFRIGERATING APPARATUS
Filed May 31, 1934
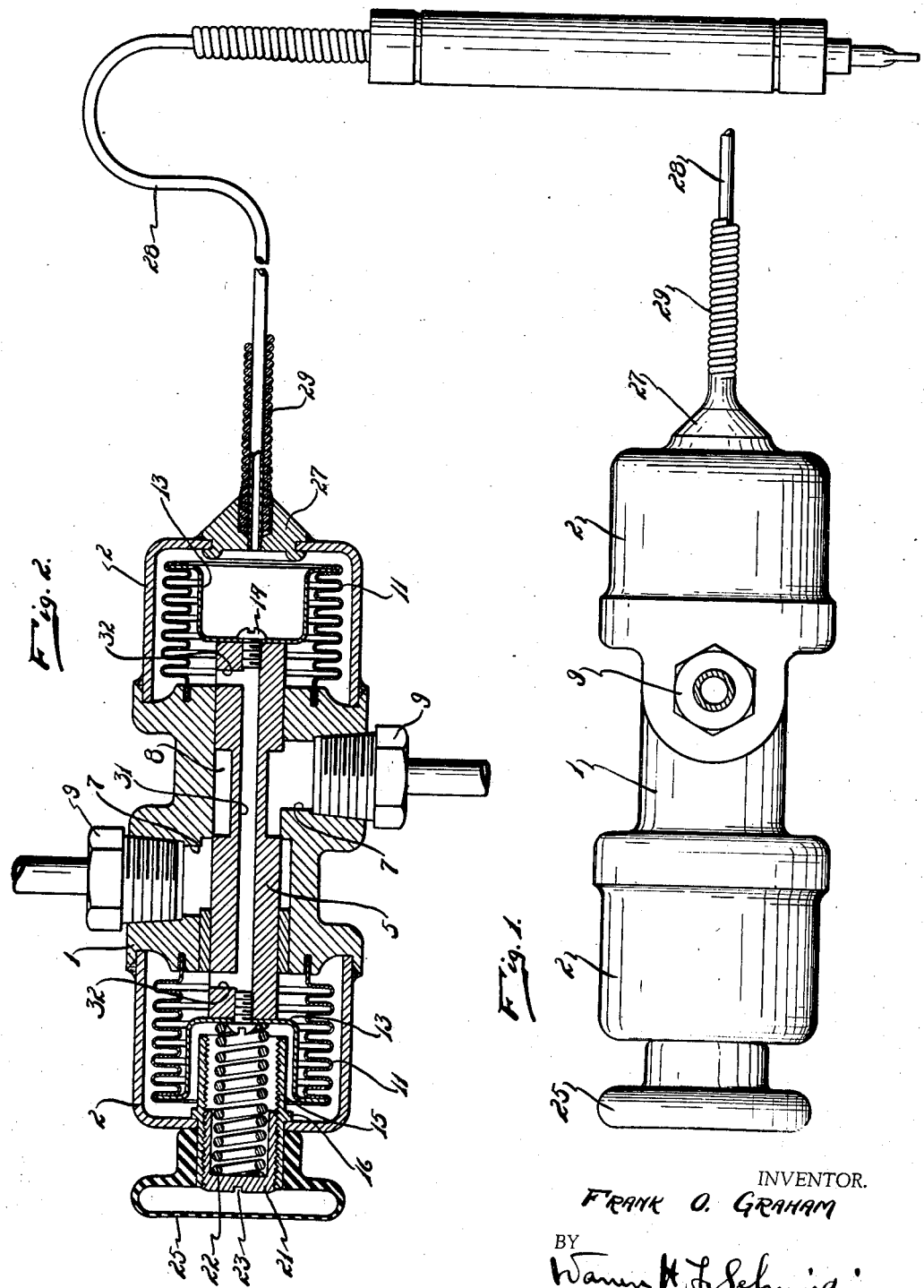
INVENTOR.
FRANK O. GRAHAM
BY
ATTORNEY.

Patented June 2, 1936

2,042,523

UNITED STATES PATENT OFFICE 2,042,523

REFRIGERATING APPARATUS

Frank O. Graham, Detroit, Mich., assignor to Kelvinator Corporation, Detroit, Mich., a corporation of Michigan Application May 31, 1934, Serial No. 728,361

1 Claim. (Cl. 137—153)

My invention pertains to a throttling valve and more particularly to a sensitive, accurate balanced valve which is especially suitable for automatic regulation and control in refrigerating systems.

It is an object of my invention to provide a hermetically sealed balanced valve with an equalizer passage to release and equalize pressures, which the leakage fluid from the ports tends to create.

It is a further object of my invention to provide a fluid flow regulating valve which is pressure balanced and equalized in order that it will respond sensitively to feeble actuating forces and will be permanent and accurate in its adjusted operation.

Another object of my invention is to provide a throttling valve in which the port pressures on the piston are balanced to provide for the accurate and sensitive operation of the valve irrespective of the varying pressure of the controlled fluid.

The invention itself, however, both as to its organization and its method of operation, together with additional objects and advantages thereof, will best be understood from the following description of specific embodiment, when read in conjunction with the accompanying drawing, in which:

Fig. 1 is an elevational view showing a completely assembled throttling valve constructed in accordance with my invention; and Fig. 2 is a sectional view thereof.

Referring more specifically to the drawing the device comprises an elongated casing 1 to the opposite ends of which are secured cup shaped housings 2 having their edges turned in adjacent the casing 1 to which they are secured in hermetically sealed relation in any suitable manner, as by welding.

Fluid controlling means, such as a piston member 5 of substantially cylindrical formation, is slidably disposed in snug fitting relation in an aperture or bore extending through the elongated casing 1. Passing through diametrically opposed portions of the casing walls are ports 7 which extend into the aperture or bore adjacent the slidable piston 5 and comprise the inlet and outlet ports through which the fluid passes.

The ports 7 are displaced axially to cooperate with a recess comprising a peripheral groove 8 extending around the slidable fluid controlling member or piston 5 through which the ports may be interconnected or cut off in accordance with the axial position of the piston in the bore of the valve casing. The arrangement of the peripheral groove 8 in the piston 5 for controlling the fluid in the ports 7 is such that the port pressures are distributed equally on the piston in both directions of travel. Fixtures 9 are provided in the ports 7 to afford convenient connection with the conduits 10 through which the working fluid passes.

Within each of the cup shaped housings 2 at opposite ends of the casing 1 a corrugated flexible metal bellows 11 is provided. The innermost end of each metal bellows is secured to the adjacent end of the casing 1 in hermetically sealed relation therewith. The outermost end of each metal bellows is hermetically secured to the open edges of an inturned cup shaped head 13 of sheet metal. The bellows heads 13 are rigidly secured to opposite ends of the slidable piston 5 by suitable screws 14 threadably received thereby.

At one end of the valve a tubular sleeve 15 is disposed in an aperture in the adjacent cup shaped housing, 2, in axially aligned relation with the slidable valve. A peripheral flange 16 extends circumferentially about an intermediate portion of the sleeve 15 in engageable relation with the inner surface of the housing. The sleeve 15 is internally threaded to receive a threaded adjusting nut 21 for adjustably compressing a biasing spring 22 against the end of the piston 5.

The external end surface of the adjusting nut 21 is provided with a screw driver receiving recess 23 whereby the biasing compression spring 22 may be conveniently adjusted against the valve. A removable sealing cap 25 of some flexible material such as rubber is fitted snugly over the outer end of the adjusting nut sleeve 15 to seal the housing and exclude the moisture laden atmosphere.

At the other end of the valve the enclosing housing 2 is provided with a suitable fixture 27 from which conduit means 28 may extend to any variable source of pressure from which the valve is to be actuated. A flexible spiral spring like guard 29 is secured to the conduit fixture and extends in protective relation around the adjacent portion of the conduit to prevent abrupt bending thereof.

In operation the variable fluid pressures applied on the flexible metal bellows adjacent the conduit 28 create a force which tends to slide the slidable fluid controlling member 5 through the elongated aperture or bore in the casing 1 in opposition to the biasing spring 22. When the fluid pressure is sufficiently great, the actuating force applied to the fluid controlling piston 5 becomes greater than the biasing pressure, and the piston will then be actuated towards the biasing spring, thereby interconnecting the ports 7, and permitting the controlled medium to pass through the peripheral groove 8 which extends around the piston.

In view of the arrangement of the throttling groove 8 in the piston to distribute the port pressures on the piston equally in both directions of travel, its degree of operation is accurately in accordance with the actuating pressures applied within the housing 2, and it is not influenced by the pressure of the controlled medium.

During the operation of the valve a small quantity of the regulated fluid will necessarily leak around the slidable piston member 5 and escape into the enclosures within the corrugated metal bellows 11 at either end of the piston. In order that the leakage fluid, which enters the bellows enclosures from the ports, will not cause unequal pressure at opposite ends of the piston 5, equalizer conduit means is provided to interconnect these two enclosures. This is accomplished by an equalizer passage 31 which extends axially through the piston 5 and is connected through lateral ducts 32 into the enclosures in the metal bellows 11. Each of the lateral ducts 32 is preferably of an axial dimension greater than the travel distance of the piston, in order that it will not be closed in either extreme position. If preferable the equalizer conduit may be provided in the valve casing or external thereto.

During the operation of the valve the leakage fluid freely passes through the equalizer passage 31 between the enclosures at opposite ends of the piston thereby releasing and equalizing pressures which would otherwise be set up therein. Because of the pressure balanced construction of my throttling valve it is very sensitive and will respond to feeble actuating forces.

The operation of the valve is conveniently adjusted by removing the rubber cap 25 and turning the adjusting nut 21 with a screw driver. Its operation thereafter remains accurate and permanent because of the pressure balanced and equalized construction of the piston and because the rubber cap keeps out the moisture which would condense and freeze about the moving parts.

The construction of the valve is such that it is especially adaptable for controlling refrigerating systems to which it is usually applied by positioning the thermo bulb in the compartment to be cooled and by connecting the valve into the suction line of the compressor to control the volume of gas removed in accordance with the temperature of the compartment.

In a multiple cooler unit installation for cooling various compartments a valve may be advantageously utilized for controlling the flow of gas from each individual compartment in accordance with the temperature therein. The valve may also be readily applied for other regulating purposes such for example as regulating the flow of steam or fuel in accordance with the temperature conditions to be controlled or for any purposes where it is desirable to accurately control a variable pressure fluid by a feeble actuating force set up in accordance with some variable quantity or condition.

It will be seen that I have provided a sensitive balanced throttling valve, which is conveniently adjustable, accurate and permanent in its operations, and especially adaptable for automatic control or regulation in response to feeble controlling forces.

Although I have shown and described certain specific embodiments of my invention, I am fully aware that many modifications thereof are possible. My invention, therefore, is not to be restricted except insofar as necessitated by the prior art.

I claim as my invention:

A valve comprising a casing, an aperture extending therethrough, ports extending through said casing into said aperture, a fluid controlling member slidably disposed in said aperture, a flexible metallic bellows having one end hermetically sealed to the end of the casing in concentric relation adjacent each end of said aperture, an out turned cup shaped bellows head having its outer edges hermetically secured to the outer edges of each bellows, means securing the bottom of each bellows head to the adjacent end of the slidable member, and an equalizer passage extending through said slidable member.

FRANK O. GRAHAM.